United States Patent
Wang et al.

(10) Patent No.: US 7,983,062 B2
(45) Date of Patent: Jul. 19, 2011

(54) MINIMUM ON-TIME REDUCTION METHOD, APPARATUS, AND SYSTEM USING SAME

(75) Inventors: Yen-Hui Wang, Hsinchu (TW); Chia-Chien Hung, Lujhu Township, Taoyuan County (TW); Chi-Hao Wu, Taipei (TW)

(73) Assignee: Grenergy Opto., Inc., Hsin-Chu (TW)

( * ) Notice: Subject to any disclaimer, the term of this patent is extended or adjusted under 35 U.S.C. 154(b) by 388 days.

(21) Appl. No.: 12/406,145

(22) Filed: Mar. 18, 2009

(65) Prior Publication Data

US 2010/0237837 A1    Sep. 23, 2010

(51) Int. Cl.
 *H02H 7/122* (2006.01)
(52) U.S. Cl. .................................................. 363/56.01
(58) Field of Classification Search ............... 363/21.12, 363/21.13, 21.15, 21.17, 50, 52, 53, 56.01, 363/56.09; 323/282, 283, 285; 361/18, 79, 361/86, 87, 91.1
See application file for complete search history.

(56) References Cited

U.S. PATENT DOCUMENTS

| | | | | |
|---|---|---|---|---|
| 6,788,556 B2* | 9/2004 | Hosotani et al. | ........... | 363/21.15 |
| 7,176,657 B2* | 2/2007 | Lee et al. | ........... | 320/166 |
| 7,671,573 B1* | 3/2010 | Ling et al. | ........... | 323/283 |
| 7,834,606 B2* | 11/2010 | Liu et al. | ........... | 323/283 |
| 2009/0201705 A1* | 8/2009 | Murata et al. | ........... | 363/53 |
| 2010/0188873 A1* | 7/2010 | Zheng et al. | ........... | 363/21.13 |

\* cited by examiner

*Primary Examiner* — Matthew Nguyen
(74) *Attorney, Agent, or Firm* — Ming Chow; Sinorica, LLC

(57) ABSTRACT

The present invention discloses a minimum on-time reduction method for a switching power conversion, comprising the steps of: generating a first reset signal and an over-supply pulse signal according to a current sensing signal and a reference signal; generating a blanking signal according to a count number of the over-supply pulse signal; and generating a second reset signal by performing Logic-AND operation on the first reset signal and the blanking signal. Furthermore, the present invention also provides a minimum on-time reduction apparatus for a power conversion, and a system using the minimum on-time reduction apparatus for a power conversion.

14 Claims, 8 Drawing Sheets

MINIMUM ON-TIME REDUCTION METHOD, APPARATUS, AND SYSTEM USING SAME

BACKGROUND OF THE INVENTION

1. Field of the Invention

The present invention relates to switching power conversions, and more particularly to switching power conversions with adjustable minimum on-time.

2. Description of the Related Art

In supplying the power for electronic equipments, switching power converters are widely adopted due to the advantages of high conversion efficiency and small component size they possess.

FIG. 1 shows the architecture of a typical AC-to-DC power adapter. As shown in FIG. 1, the architecture realizing a fly-back type AC-to-DC power converter, at least includes: a PWM controller 100, an input rectifier and filter 101, a main transformer 102, an output rectifier and filter 103, a feedback network 104, an NMOS transistor 105, a flux releasing circuit 106 and a resistor 107.

In the architecture, the PWM controller 100 is used for generating a PWM signal $V_{out}$ with a duty cycle in response to both a current sensing voltage $V_S$ and a reference voltage (not shown in FIG. 1) which is a function of a feedback signal $V_{FB}$. When the current sensing voltage $V_S$ exceeds the reference voltage, a reset signal (not shown in FIG. 1) is generated to pull down the PWM signal $V_{out}$ to end the duty cycle.

The input rectifier and filter 101 is used for generating a first DC voltage according to an AC input power source.

The main transformer 102 and the output rectifier and filter 103 are used to transfer the first DC voltage to a DC output voltage $V_O$.

The feedback network 104 is used to generate the feedback signal $V_{FB}$ according to the DC output voltage $V_O$.

The NMOS transistor 105 is used to control the power transformation through the main transformer 102 in response to the PWM signal $V_{out}$.

The flux releasing circuit 106 comprising a diode 108 is coupled with the primary side of the main transformer 102 for releasing the magnetic flux to protect the NMOS transistor 105 when the NMOS transistor 105 is off.

The resistor 107 is used for carrying a drain current $I_P$ of an NMOS transistor to exhibit the current sensing voltage $V_S$.

Through a periodic on-and-off switching of the NMOS transistor 105, which is driven by the PWM signal $V_{out}$ generated from the PWM controller 100, the input power is transformed through the main transformer 102 to the output.

However, when the PWM signal $V_{out}$ makes a low-to-high transition, the diode 108 will stay on for a while due to a reverse recovery time of the diode 108, and there will be a reverse recovery current flowing down through the flux releasing circuit 106 to shift up the current sensing voltage $V_S$ across the resistor 107. If the current sensing voltage $V_S$ is shifted up to a level greater than the reference voltage, the reset signal will make a low-to-high transition and a reset glitch is generated. As a result, the duty cycle will be ended at a wrong time and will fail the power conversion.

One solution that conventional power converters utilize to solve this problem is to mask the reset signal with a leading edge blanking (LEB) signal so that during a blanking period the duty cycle will not be ended.

Please refer to FIG. 2, which shows a prior art circuit diagram for eliminating a reset glitch of a switching power converter. As shown in FIG. 2, the prior art circuit includes a comparator 201 and a Logic-AND gate 202. The comparator 201 is used to generate a reset signal according to a reference voltage $V_{ref}$ and a current sensing voltage $V_S$. The Logic-AND gate 202 is used to generate a controller reset signal according to the reset signal and a conventional LEB signal.

To effectively mask the possible glitches in the reset signal, the conventional LEB signal is designed to have a blanking period covering the whole period of the reverse recovery time. Please refer to FIG. 3, which shows the waveform diagram according to the prior art circuit in FIG. 2, illustrating the process of eliminating a reset glitch. As shown in FIG. 3, a blanking period $T_{blank}$ is predetermined for eliminating all possible reset glitches during a reverse recovery time $T_{RR}$.

Although the design of the blanking period $T_{blank}$ may be able to eliminate all possible reset glitches during the reverse recovery time $T_{RR}$, it also sets a minimum limit to the turn-on time of the NMOS transistor 105 in FIG. 1. If the required period of a duty cycle is shorter than the blanking period $T_{blank}$, the duration of the duty cycle is not going to take the required period but take the blanking period $T_{blank}$ in stead. In this case, there will be over-power supplying to a load of the switching power converter in the successive duty cycles. As the over-power being accumulated in the form of an increasing magnetic flux during the successive duty cycles, the load of the power converter will be crashed by an over rating current from the increasing magnetic flux.

Therefore, there is a need for providing a solution capable of preventing over supplying power to the load of a switching power converter in the prior art circuit.

Seeing this bottleneck, the present invention proposes a novel topology for generating a PWM signal capable of adaptively providing a blanking period of the duty cycles to prevent over supplying power to the load.

SUMMARY OF THE INVENTION

One objective of the present invention is to provide a minimum on-time reduction method for a switching power converter to adaptively adjust the blanking period of the duty cycles to prevent over supplying power to the load.

Another objective of the present invention is to further provide a minimum on-time reduction apparatus for a switching power converter to adaptively adjust the blanking period of the duty cycles to prevent over supplying power to the load.

Still another objective of the present invention is to further provide a system using a minimum on-time reduction apparatus for a switching power converter to adaptively adjust the blanking period of the duty cycles to prevent over supplying power to the load.

To achieve the foregoing objectives of the present invention, a minimum on-time reduction method for a switching power conversion is proposed, the method comprising the steps of: generating a first reset signal according to voltage comparison of a current sensing signal and a reference signal; generating an over-supply pulse signal according to voltage comparison of the current sensing signal and an up-shifted reference signal; generating a blanking signal having a blanking period according to a count number of the over-supply pulse signal; and generating a second reset signal by performing Logic-AND operation on the first reset signal and the blanking signal.

To achieve the foregoing objectives, the present invention further provides a minimum on-time reduction apparatus for a switching power conversion, comprising: a first comparator for generating a first reset signal according to voltage comparison of a current sensing signal and a reference signal; a second comparator for generating an over-supply pulse signal according to voltage comparison of the current sensing signal and an up-shifted reference signal; a blanking unit for generating a blanking signal having a blanking period according to a count number of the over-supply pulse signal; and a Logic-AND gate for generating a second reset signal by performing Logic-AND operation on the first reset signal and the blanking signal.

To achieve the aforesaid objectives, the present invention further provides a system using a minimum on-time reduction apparatus for a switching power conversion, comprising: a first comparator for generating a first reset signal according to voltage comparison of a current sensing signal and a reference signal; a second comparator for generating an over-supply pulse signal according to voltage comparison of said current sensing signal and an up-shifted reference signal; a blanking unit for generating a blanking signal having a blanking period according to a count number of the over-supply pulse signal; a Logic-AND gate for generating a second reset signal by performing Logic-AND operation on the first reset signal and the blanking signal; and a power conduction unit, responsive to a PWM signal to provide a power conduction path, wherein the PWM signal is responsive to a set signal and the second reset signal.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 4:
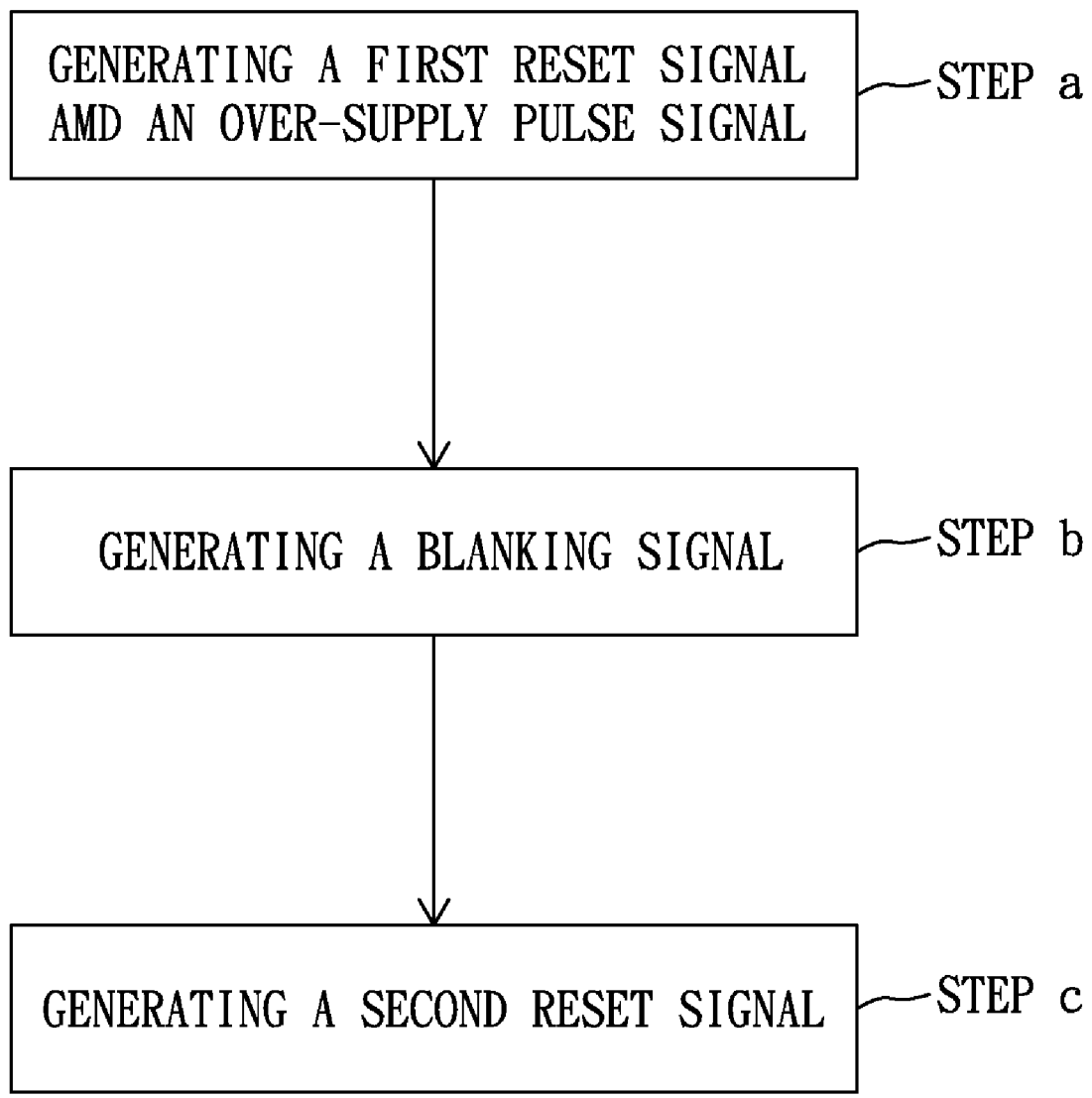
FIG. 4 is the flow chart of a minimum on-time reduction method for preventing over supplying power to a load of a switching power converter according to a preferred embodiment of the present invention.

Please refer to FIG. 4, which shows the flow chart of a minimum on-time reduction method for preventing over supplying power to a load of a switching power converter according to a preferred embodiment of the present invention. As shown in FIG. 4, the minimum on-time reduction method includes the steps of: generating a first reset signal and an over-supply pulse signal (step a); generating a blanking signal (step b); and generating a second reset signal (step c).

In step a, the first reset signal is generated according to voltage comparison of a current sensing signal and a reference signal, and the over-supply pulse signal is generated according to voltage comparison of the current sensing signal and an up-shifted reference signal. The current sensing signal is generated across a resistor carrying a drain current of an NMOS transistor. The reference signal is a function of an output error signal of the switching power converter, and the up-shifted reference signal is derived by shifting up the reference signal with a DC level.

In step b, the blanking signal having a blanking period is generated according to a count number of the over-supply pulse signal. When the count number increases, it means that the actual period of the duty cycles of the switching power converter is longer than the required period and there will be over supplying power to a load of the switching power conversion. In this case, the blanking period is reduced to allow shorter duty cycles and thereby stop over supplying power to the load.

In step c, a second reset signal is generated by performing Logic-AND operation on the first reset signal and the blanking signal. As the second reset signal is used to end a duty cycle, so if the blanking period of the blanking signal is shortened, the second reset signal can be generated at an earlier time to provide a shorter duty cycle.

Figure 5:
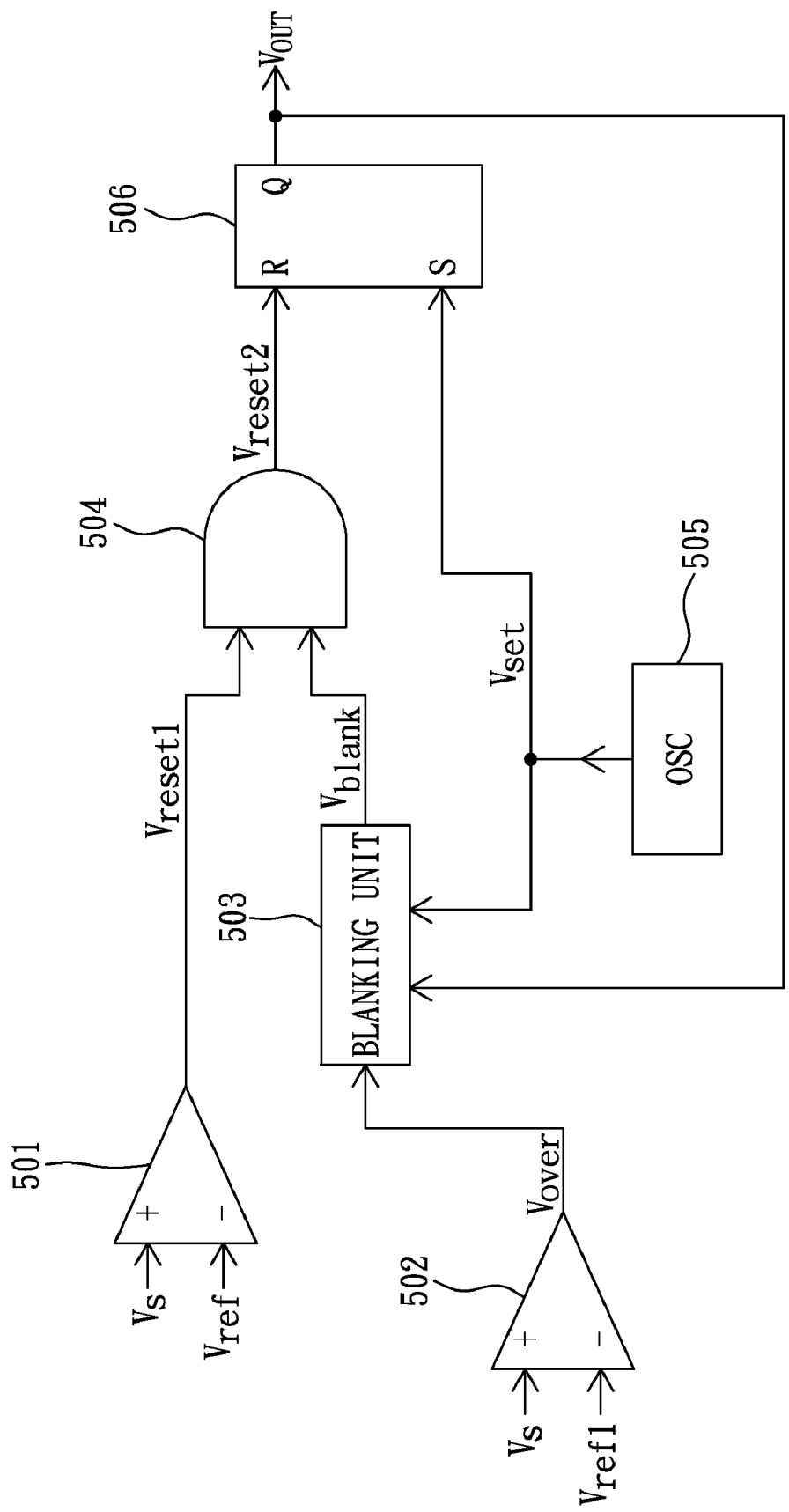
FIG. 5 is the block diagram of a minimum on-time reduction apparatus for preventing over supplying power to a load of a switching power converter according to a preferred embodiment of the present invention.

Please refer to FIG. 5, which shows the block diagram of a minimum on-time reduction apparatus for preventing over supplying power to a load of a switching power converter according to a preferred embodiment of the present invention. As shown in FIG. 5, the minimum on-time reduction apparatus for preventing over supplying power to a switching power converter comprises a comparator 501, a comparator 502, a blanking unit 503, an AND gate 504, an oscillator 505 and a latch 506.

The comparator 501 is used to generate a first reset signal $V_{reset1}$ according to voltage comparison of a current sensing signal $V_s$ and a reference signal $V_{ref}$. The current sensing signal $V_s$ is generated across a resistor carrying a drain current of an NMOS transistor. The reference signal $V_{ref}$ is a function of an output error signal of the switching power converter.

The comparator 502 is used to generate an over-supply pulse signal $V_{over}$ according to voltage comparison of the current sensing signal $V_s$ and an up-shifted reference signal $V_{ref1}$. The up-shifted reference signal $V_{ref1}$ is derived by shifting up the reference signal $V_{ref}$ with a DC level.

The blanking unit 503 is used to generate a blanking signal $V_{blank}$ according to a set signal $V_{set}$, a pulse width modulation signal $V_{OUT}$ and a count number of the over-supply pulse signal $V_{over}$. The blanking signal $V_{blank}$ has a blanking period and a pass period. The blanking period is started by the set signal $V_{set}$ and lasts for a time inverse proportional to the count number. The pass period proceeding after the blanking period lasts until the end of a duty cycle of the pulse width modulation signal $V_{OUT}$. When the count number increases, it means that the actual duty cycles of the switching power converter are longer than the required ones and there will be power over supplying to a load of the switching power converter. In this case, the blanking period is reduced accordingly to allow shorter duty cycles and thereby stop over supplying power to the load.

The AND gate 504 is used to generate a second reset signal $V_{reset2}$ by performing Logic-AND operation on the first reset signal $V_{reset1}$ and the blanking signal $V_{blank}$.

The oscillator 505 is used to generate the set signal $V_{set}$.

The latch 506 is used to generate the pulse width modulation signal $V_{OUT}$ according to the set signal $V_{set}$ and the second reset signal $V_{reset2}$.

Figure 6:
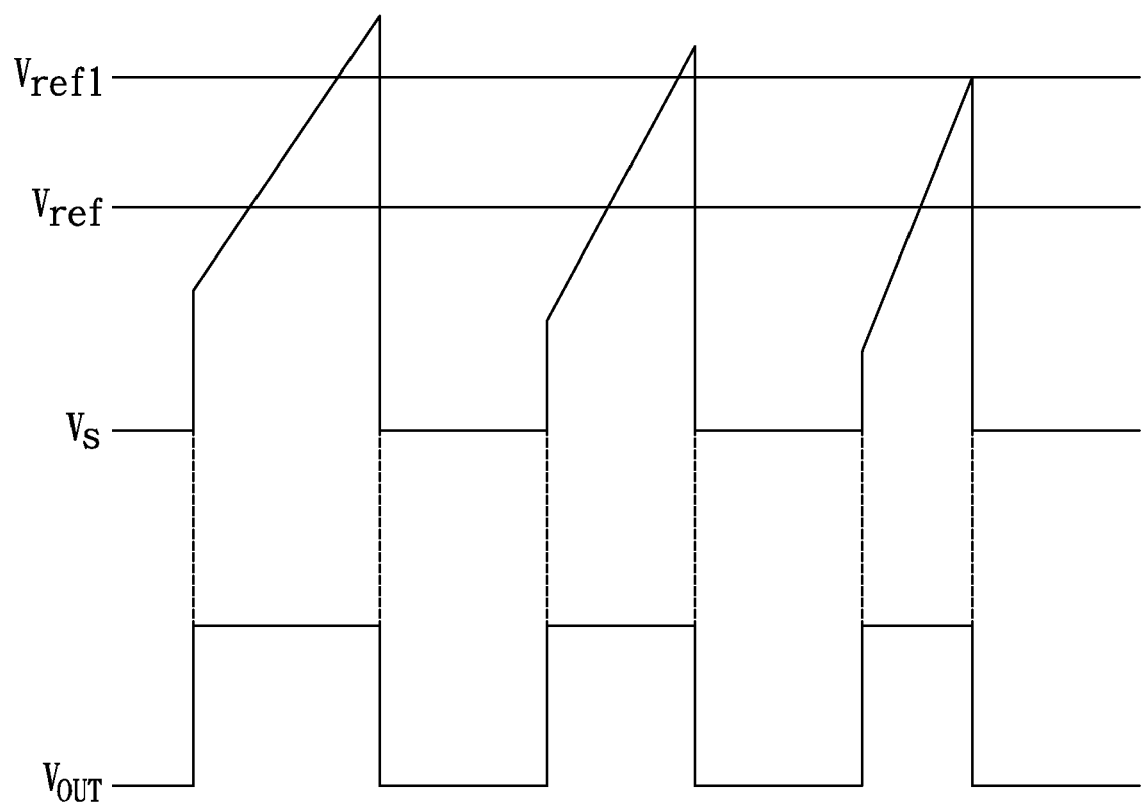
FIG. 6 is the corresponding waveform of the current sensing signal $V_s$ and the pulse width modulation signal $V_{OUT}$ in the blanking period reduction process of the minimum on-time reduction apparatus of FIG. 5.

FIG. 6 shows the corresponding waveform of the current sensing signal $V_s$ and the pulse width modulation signal $V_{OUT}$ in the blanking period reduction process of the minimum on-time reduction apparatus of FIG. 5. As illustrated in FIG. 6, the actual duty cycle of the pulse width modulation signal $V_{OUT}$ is decreasing and the over power supplying is stopped.

Figure 7:
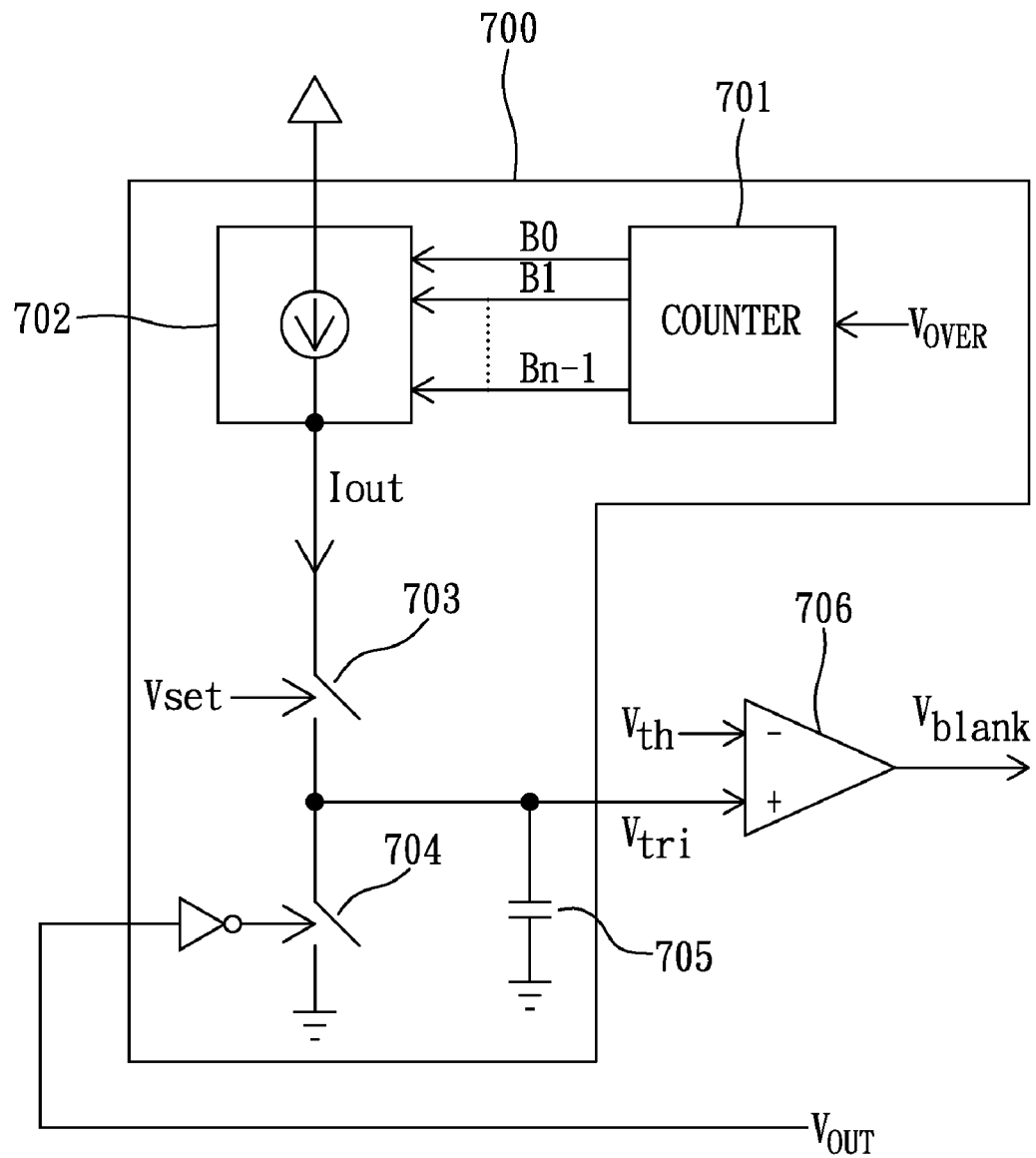
FIG. 7 is a detailed block diagram of the blanking unit of FIG. 5.

FIG. 7 shows a detailed block diagram of the blanking unit of FIG. 5. As shown in FIG. 7, the blanking unit comprises a triangle signal generator 700 and a comparator 706.

The triangle signal generator 700 comprises a counter 701, a charging current source 702, a switch 703, a switch 704 and a capacitor 705.

The counter 701 is used to generate an n-bit count number for the counting of the over-supply pulse signal $V_{over}$.

The charging current source 702 is used to generate a charging current $I_{out}$ proportional to the n-bit count number.

The switch 703 is used to conduct the charging current $I_{out}$ under the control of the set signal $V_{set}$.

The switch 704 is used to clear the charge of the capacitor 705 under the control of the pulse width modulation signal $V_{OUT}$.

The capacitor 705 is used to generate a triangle signal $V_{tri}$ according to the charging current $I_{out}$, under the control of the set signal $V_{set}$ and the pulse width modulation signal $V_{OUT}$. The ramp-up slope of the triangle signal $V_{tri}$ is proportional to the charging current $I_{out}$.

The comparator 706 is used to generate the blanking signal $V_{blank}$ according to voltage comparison of the triangle signal $V_{tri}$ and a threshold voltage $V_{th}$. The low level period of the blanking signal $V_{blank}$, i.e. the blanking period, is inverse proportional to the ramp-up slope of the triangle signal $V_{tri}$.

Figure 8:
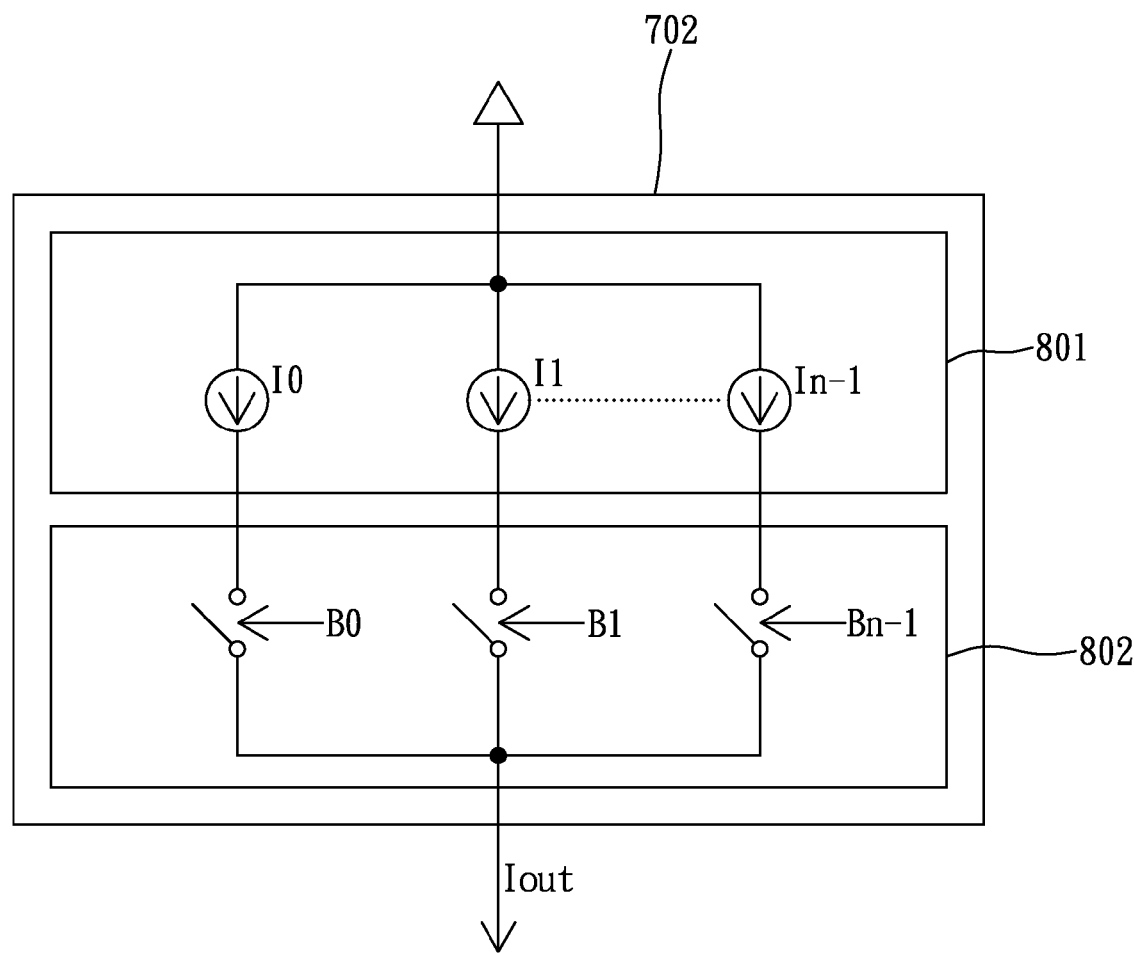
FIG. 8 is a detailed block diagram of the charging current source of FIG. 7.

FIG. 8 shows a detailed block diagram of the charging current source of FIG. 7. As shown in FIG. 8, the charging current source 702 comprises a set of current sources 801 and a set of switches 802.

The set of current sources 801 provides n binary-weighted current sources.

The set of switches 802 provides a combination of the set of current sources 801 to output the charging current $I_{out}$.

Figure 1:
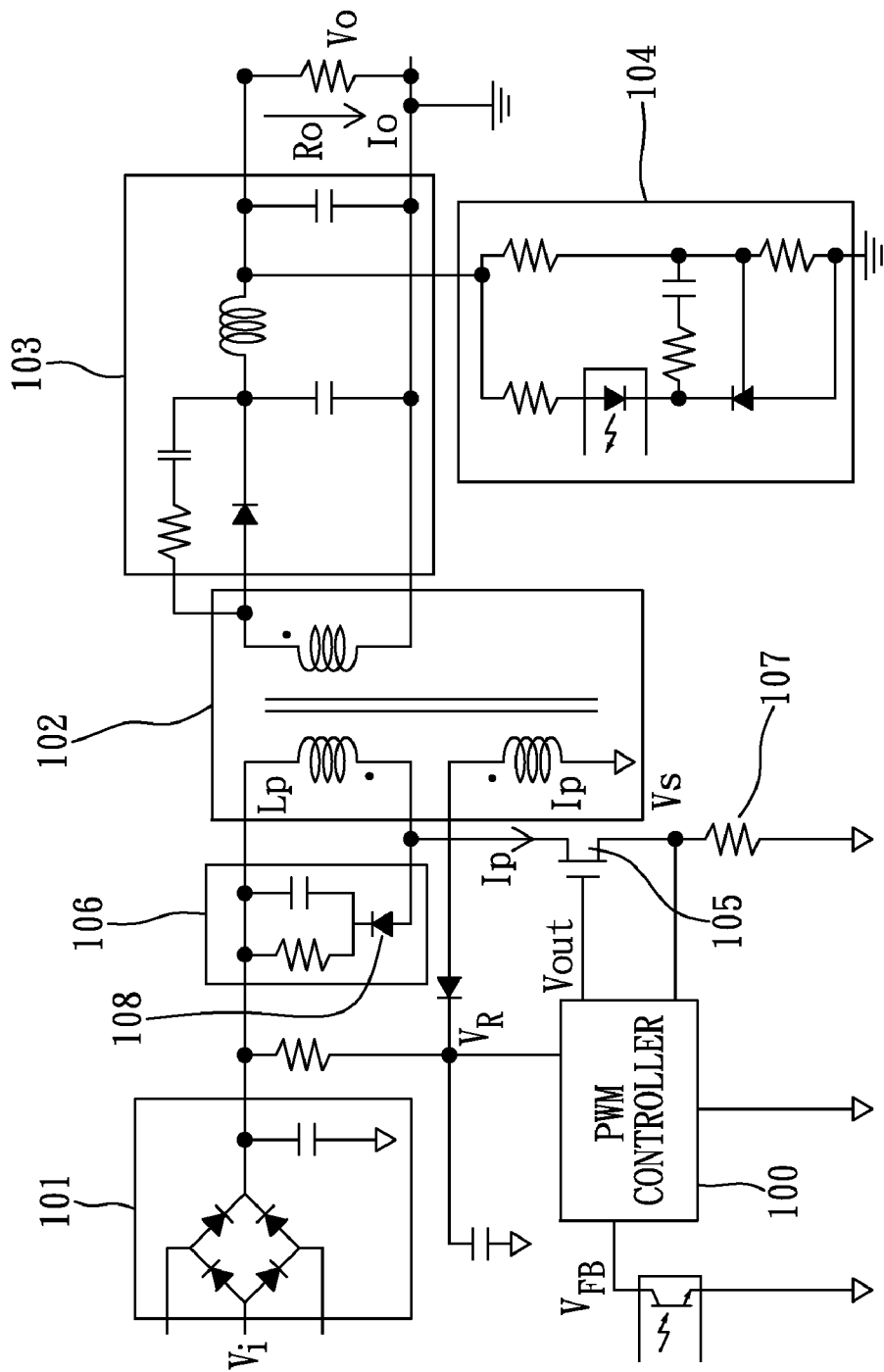
FIG. 1 is the architecture of a typical AC-to-DC power adapter.
Figure 2:
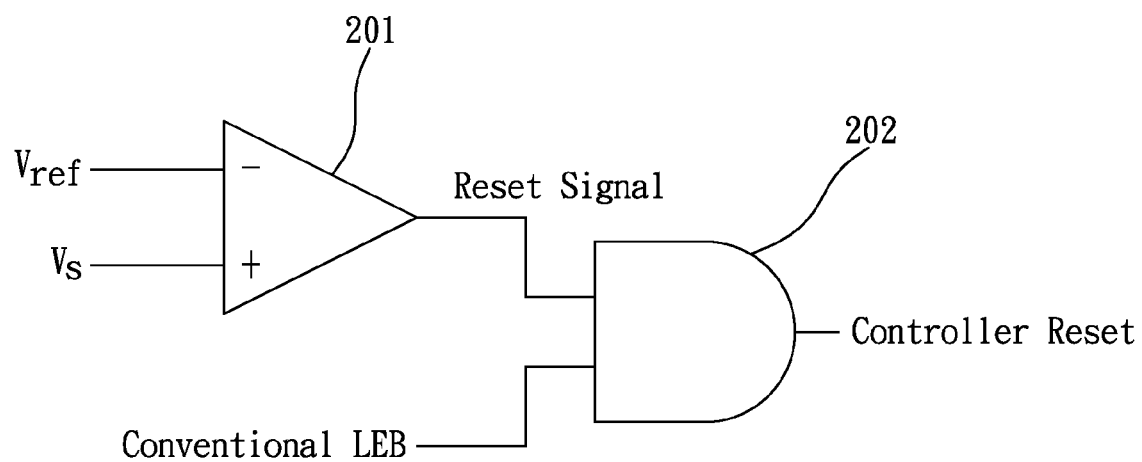
FIG. 2 is a prior art circuit diagram for eliminating a reset glitch of a switching power converter.
Figure 3:
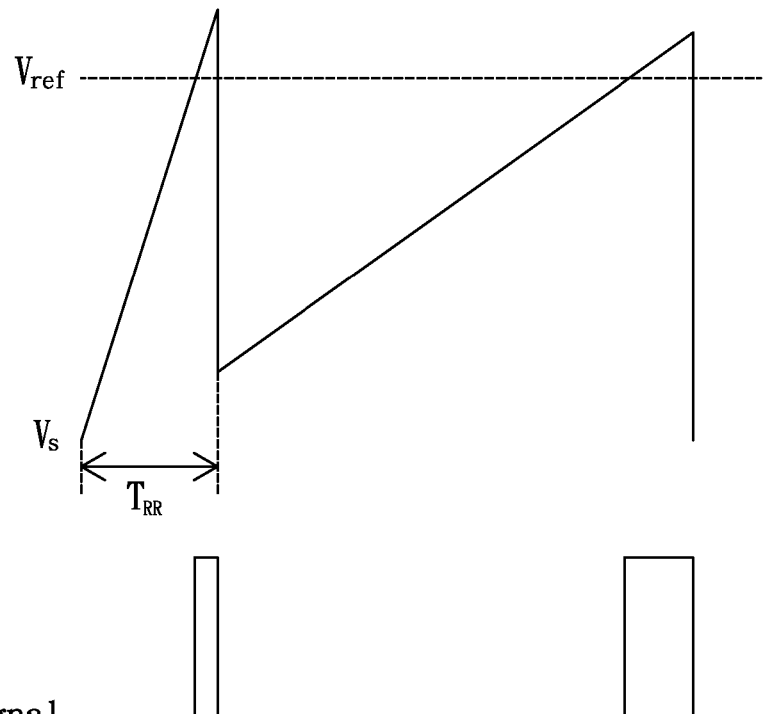
FIG. 3 is the waveform diagram according to the prior art circuit in FIG. 2, illustrating the process of eliminating a reset glitch.
Figure 3:
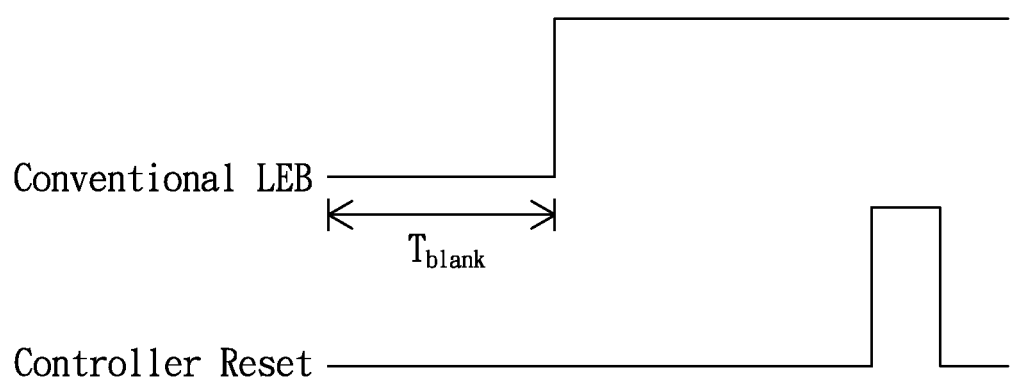

Using the minimum on-time reduction apparatus of a preferred embodiment of the present invention as illustrated in FIG. 5 to implement the PWM controller 100 in the typical AC-to-DC power adapter as shown in FIG. 1, an AC-to-DC power adapter capable of preventing over supplying power to a load of a switching power converter is proposed. Besides, the present invention can be applied to the switching power conversion of AC to AC, DC to AC, or DC to DC, and the architecture of the switching power conversion can be close loop or open loop.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A minimum on-time reduction method for a switching power conversion, comprising the steps of:

generating a first reset signal according to voltage comparison of a current sensing signal and a reference signal;

generating an over-supply pulse signal according to voltage comparison of said current sensing signal and an up-shifted reference signal;

generating a blanking signal having a blanking period according to a count number of said over-supply pulse signal; and generating a second reset signal by performing Logic-AND operation on said first reset signal and said blanking signal.

2. The method according to claim 1, wherein said current sensing signal is generated across a resistor carrying a drain current of an NMOS transistor.

3. The method according to claim 1, wherein said reference signal is a function of an output error signal of said switching power conversion, and said up-shifted reference signal is derived by shifting up said reference signal with a DC level.

4. The method according to claim 1, wherein said blanking period is generated according to voltage comparison of a triangle signal and a threshold voltage, wherein said triangle signal has a ramp-up slope proportional to a charging current.

5. The method according to claim 4, wherein said charging current is proportional to said count number.

6. A minimum on-time reduction apparatus for a switching power conversion, comprising:

a first comparator for generating a first reset signal according to voltage comparison of a current sensing signal and a reference signal;

a second comparator for generating an over-supply pulse signal according to voltage comparison of said current sensing signal and an up-shifted reference signal;

a blanking unit for generating a blanking signal having a blanking period according to a count number of said over-supply pulse signal; and a Logic-AND gate for generating a second reset signal by performing Logic-AND operation on said first reset signal and said blanking signal.

7. The apparatus according to claim 6, wherein said current sensing signal is generated across a resistor carrying a drain current of an NMOS transistor.

8. The apparatus according to claim 6, wherein said reference signal is a function of an output error signal of said switching power conversion, and said up-shifted reference signal is derived by shifting up said reference signal with a DC level.

9. The apparatus according to claim 6, wherein said blanking unit comprises:

a triangle signal generator, used for generating a triangle signal having a ramp-up slope proportional to a charging current, wherein said charging current is proportional to said count number; and a third comparator for generating said blanking signal according to voltage comparison of said triangle signal and a threshold voltage.

10. The apparatus according to claim 9, wherein said triangle signal generator comprises:

a counter, used for generating said count number by counting said over-supply pulse signal;

a charging current generator, used for generating said charging current according to said count number; and a capacitor, used for generating said triangle signal by coupling to said charging current generator.

11. The apparatus according to claim 10, wherein said charging current generator comprises a plurality of binary weighted current sources.

12. A system using a minimum on-time reduction apparatus for a switching power conversion, comprising:
- a first comparator for generating a first reset signal according to voltage comparison of a current sensing signal and a reference signal;
- a second comparator for generating an over-supply pulse signal according to voltage comparison of said current sensing signal and an up-shifted reference signal;
- a blanking unit for generating a blanking signal having a blanking period according to a count number of said over-supply pulse signal;
- a Logic-AND gate for generating a second reset signal by performing Logic-AND operation on said first reset signal and said blanking signal; and
- a power conduction unit, responsive to a PWM signal to provide a power conduction path, wherein said PWM signal is responsive to a set signal and said second reset signal.

13. The system according to claim 12, wherein said switching power conversion is one selected from the group consisting of AC to DC, AC to AC, DC to AC, and DC to DC.

14. The system according to claim 12, wherein said switching power conversion is one selected from the group consisting of close loop and open loop.

* * * * *